United States Patent
Curtin et al.

(10) Patent No.: US 9,479,951 B2
(45) Date of Patent: Oct. 25, 2016

(54) SELECTIVE REAL-TIME GTP SESSION TRACKING USING DISTRIBUTED PROCESSING TECHNIQUES

(71) Applicant: Tektronix, Inc., Beaverton, OR (US)

(72) Inventors: John Peter Curtin, Richardson, TX (US); Seshu Dommaraju, Plano, TX (US); Vignesh Janakiraman, Plano, TX (US)

(73) Assignee: NetScout Systems Texas, LLC, Westford, MA (US)

( * ) Notice: Subject to any disclaimer, the term of this patent is extended or adjusted under 35 U.S.C. 154(b) by 92 days.

(21) Appl. No.: 14/272,943

(22) Filed: May 8, 2014

(65) Prior Publication Data

US 2015/0327091 A1 Nov. 12, 2015

(51) Int. Cl.
*H04W 24/08* (2009.01)
*H04L 29/08* (2006.01)
*H04L 12/26* (2006.01)

(52) U.S. Cl.
CPC .......... *H04W 24/08* (2013.01); *H04L 43/0811* (2013.01); *H04L 43/12* (2013.01); *H04L 67/10* (2013.01)

(58) Field of Classification Search
CPC H04W 92/06; H04W 80/04; H04L 63/0428; H04L 63/08; H04L 9/321; H04L 9/0833
See application file for complete search history.

(56) References Cited

U.S. PATENT DOCUMENTS

| | | | |
|---|---|---|---|
| 6,748,434 B2 * | 6/2004 | Kavanagh | H04L 29/12066 709/224 |
| 2010/0098051 A1 * | 4/2010 | Uemura | H04W 56/0015 370/350 |
| 2011/0128907 A1 * | 6/2011 | Kvernvik | H04L 12/5691 370/328 |

* cited by examiner

*Primary Examiner* — Anez Ebrahim
(74) *Attorney, Agent, or Firm* — Locke Lord LLP; Scott D. Wofsy; Christopher J. Capelli

(57) ABSTRACT

A distributed network monitoring device monitors via a lightweight session tracking module of a network monitoring device, control plane data for connectivity sessions of User Equipment (UE) in a communication network. The lightweight session tracking module selectively identifies at least one bearer for a corresponding connectivity session according to one or more control plane attributes and associates each selectively identified bearer for the corresponding connectivity session with a bearer routing rule for user plane data. A packet routing module receives user plane data for connectivity sessions of UE and transmits the user plane data of the connectivity sessions according to the bearer routing rule of the lightweight session tracking module to a flow processing module for subsequent data flow analysis.

15 Claims, 5 Drawing Sheets

SELECTIVE REAL-TIME GTP SESSION TRACKING USING DISTRIBUTED PROCESSING TECHNIQUES

BACKGROUND

1. Field of the Invention

The present disclosure relates to tracking User Equipment (UE) sessions, and more particularly, to providing scalable selective and real-time General Packet Radio Service (GPRS) Tunneling Protocol (GTP) session tracking using distributed processing techniques.

2. Description of the Related Art

Traditionally, mobile communication networks such as Global System for Mobile Communications (GSM) employed circuit switching architectures whereby hardware circuits establish connections between a calling and a called party throughout the network. This circuit switching architecture was improved upon by a General Packet Radio Service (GPRS) architecture, which incorporated packet-switching technologies to transport data as packets without the establishment of dedicated circuits. Notably, the GPRS architecture was employed as a supplement or overlay upon the GSM architecture and still uses circuit switching technologies of the underlying GSM architecture.

A 3rd Generation Partnership Project (3GPP) organization improved upon the GPRS architectures and provided guidelines for implementing new system architectures for mobile communication networks. In particular, the 3GPP community modeled its network on the packet switching approach of the GPRS architecture and used an IP (Internet Protocol) based routing for all data. The 3GPP architecture is generally referred to as Evolved 3GPP Packet Switched Domain—also known as the Evolved Packet System (EPS).

When designing, maintaining, and/or operating any communication network—e.g., GSM networks, GPRS networks, EPS networks, etc.—data flows are monitored and analyzed to provide important insight into potential network problems as well as provide insight into a current state of the network Quality of Service parameters, and the like. Such network monitoring can be used to address existing network problems as well as to improve overall network design.

However, with an increasingly large consumer adoption of mobile devices, the amount of network data to be monitored quickly exceeds current hardware and software capabilities of traditional monitoring devices. Some conventional attempts to meet the need for network monitoring in such a high bandwidth environment merely increase an amount of dedicated monitoring hardware, which also requires increasingly complex software to provide appropriate control and coordination. In turn, such conventional attempts quickly become cost prohibitive. Thus, a need remains to provide cost-effective systems and methods that selectively monitor data in high bandwidth environments. Such systems and methods can further employ accurate real-time monitoring in a cost effective fashion using distributed systems.

SUMMARY

This disclosure provides techniques for real-time General Packet Radio Service (GPRS) Tunneling Protocol (GTP) session tracking using distributed processing techniques. In particular, the techniques provided herein independently analyze control plane data for GTP sessions (e.g., GTP-C data) and selectively filter or identify bearers of the connectivity session according to control plane attributes. Using these bearers, a bearer routing rule or table is generated and used by a distributed network monitoring system to determine if received user plane data (e.g., GTP-U data) will be substantively analyzed (e.g., for Quality of Service (QoS), Key Performance Indicators (KPIs), etc.). In this fashion, a small amount of control plane data is initially identified and/or filtered prior to using a large amount of network resources to analyze session data.

In particular, according to one embodiment of the disclosure, a network monitoring system monitors via a lightweight session tracking module of a network monitoring device, control plane data for connectivity sessions of User Equipment (UE) in a communication network (e.g., General Packet Radio Service (GPRS) Tunneling Protocol (GTP) sessions, etc.). For example, the lightweight session tracking module monitor network interfaces from an Evolved Node B (eNB), a Mobility Management Entity (MME) node, a Serving Gateway (SGW) node, a Packet data Network Gateway (PGW) node, and a Serving General Packet Radio Service (GPRS) Support Node (SGSN), etc. The lightweight session tracking module further selectively identifies at least one bearer for a corresponding connectivity session according to one or more control plane attributes. Such control plane attributes, include, but are not limited to: a network interface, a network node, and subscriber identification of UE, an International Mobile Subscriber Identity (IMSI), International Mobile Station Equipment Identity (IMEI), and a Mobile Station International Subscriber Directory Number (MSISDN), and the like. The lightweight session tracking module further also associates each selectively identified bearer for the corresponding connectivity session with a bearer routing rule for user plane data. Typically, when associating each selectively identified bearer, the lightweight session tracking module generates the bearer routing rule for user plane data based on at least one of a tunnel identifier and an Internet Protocol address for each bearer for the corresponding connectivity session. A packet routing module (e.g., of the network monitoring system), receives user plane data for connectivity sessions of UE and transmits the user plane data of the connectivity sessions according to the bearer routing rule of the lightweight session tracking module to a flow processing module for subsequent data flow analysis.

In certain embodiments, the user plane data for connectivity sessions of UE received by the packet routing module that is not included in the bearer routing rule for user plane data results in non-routable data. In such embodiments, the packet routing module can discard the non-routable data or, alternatively, the packet routing module can locally cache the non-routable data in an effort to route the data after the updated bearer rules arrive at the packet routing module.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DESCRIPTION OF EXAMPLE EMBODIMENTS

As discussed above, an increase in mobile device users (e.g., subscribers) directly correlates to an increase in the amount of data transferred within in various mobile communication networks such as the General Packer Radio Service (GPRS) architecture and the 3GPP Evolved Packet System (EPS) architecture. With respect to data transfer, data packets are generally transferred in the GPRS architecture (e.g., within the packet switching core network) and the EPS architecture via a GPRS Tunneling Protocol (GTP), which is a defined group of IP-based communications protocols.

Operatively, GTP sessions are created within these networks to transfer data packets for a subscriber's User Equipment (UE)). The data packets and the associated sessions are monitored and analyzed by network monitoring devices to provide important insight into potential network problems, provide real-time models of bandwidth and network usage, determine Quality of Service (QoS), Key Performance Indicators (KPIs), and the like.

GPRS Core Network

Figure 1:
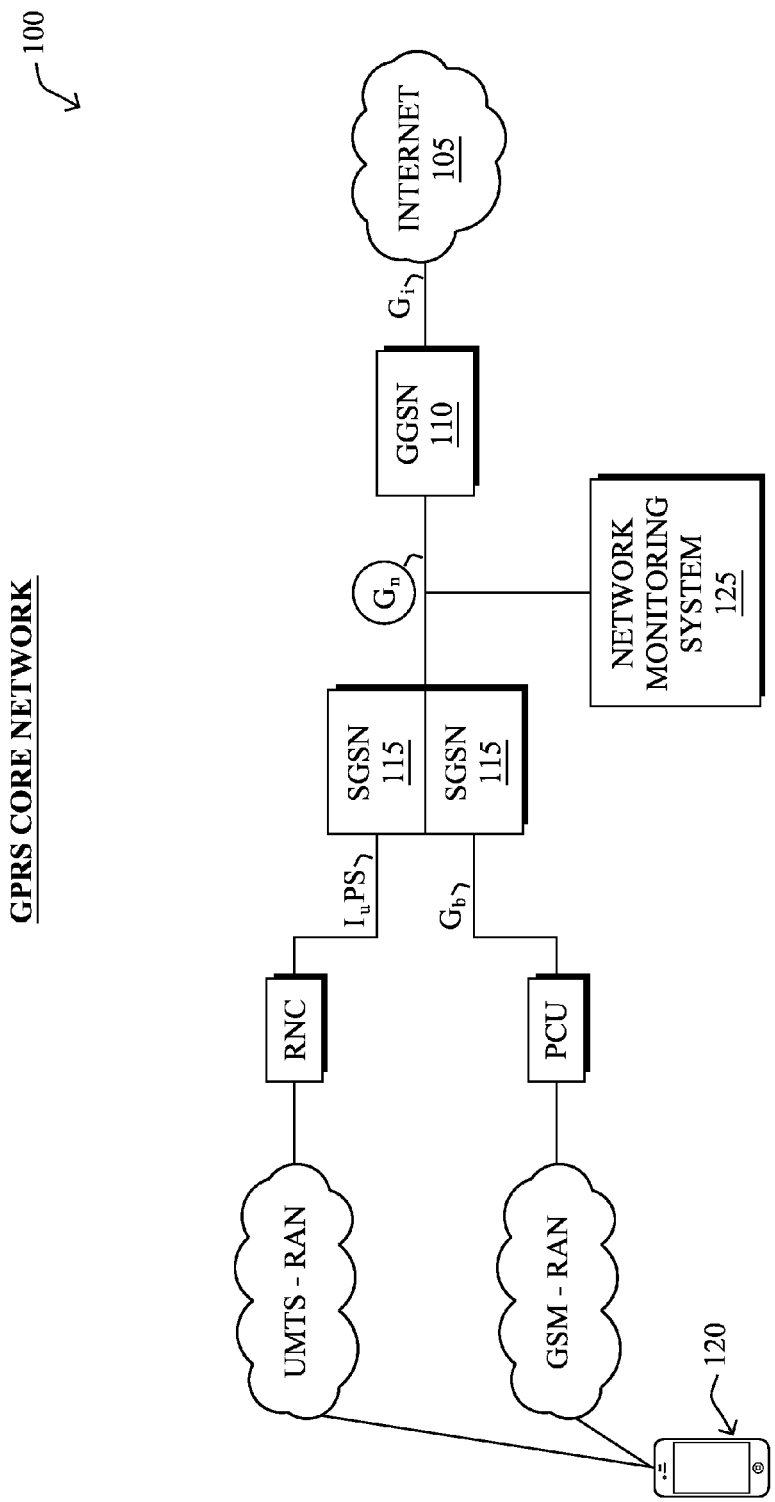
FIG. 1 shows an overview on the architecture of a GPRS Core Architecture.

FIG. 1 illustrates a GPRS Core Network 100. GPRS core network 100 is a central part of the general packet radio service (GPRS) and communicates subscriber data from UE 120 as IP packets to/from external networks such as the Internet 105. As discussed above, the GPRS system is an integrated part of the GSM network switching subsystem (not shown). GPRS core network 100 provides mobility management, session management and transport for IP packet services in, for example, GSM and WCDMA networks.

As discussed above, GPRS core network 100 uses GTP (e.g., an IP-based protocol) to transfer data packets. Primarily, GTP is the protocol which allows end users of a GSM or WCDMA network to move to various physical locations continuing to connect to the Internet 105 as if from one location at a Gateway GPRS support node (GGSN) 110. GTP carries subscriber data (e.g., from a subscriber's current serving GPRS support node (SGSN) 115) to GGSN 110 which handles a subscriber session (e.g., a GTP session) over a Gn interface (i.e. the network interface between GGSN(s) and SGSN(s)).

Further, GTP is comprised of (in part) of GTP control plane (GTP-C) data and GTP user plane (GTP-U) data. GTP-U data transfers subscriber data in separated tunnels for each Packet Data Protocol (PDP) context while GTP-C data incorporates, for example, setup and deletion of PDP contexts, verification of GSN reachability, updates, updates; e.g., as subscribers move from one SGSN to another, etc.

GGSN 110, in particular, is responsible for internetworking between the GPRS network and external packet switched networks, like the Internet and X.25 networks. Operatively, GGSN 110 receives data addressed to a specific user and checks if UE 120 has an active session. If UE 120 has an active session, GGSN 110 forwards data from UE 120 to SGSN 115, which serves the UE 110. If UE 110 does not have an active session (e.g., the UE is inactive), the data is discarded at GGSN 110. Notably, GGSN 110 enables the mobility (e.g., location changes) of UE 120 in the GPRS/UMTS networks. GGSN 110 maintains routing information necessary to tunnel protocol data units (PDUs) to the SGSN that services a particular UE 120.

GGSN 110 also converts the GPRS packets coming from SGSN 115 into an appropriate packet data protocol (PDP) format (e.g., IP, X.25, etc.) and sends the converted data on the corresponding packet data network. GGSN 110 also converts PDP addresses of incoming data packets to a GSM address of the destination user (e.g., UE 110). The re-addressed data packets are sent to the responsible SGSN 115. For this purpose, GGSN 110 stores the current SGSN address of the user and user profile in its location register. GGSN 110 is responsible for IP address assignment and is the default router for the connected user equipment (UE).

SGSN 115 is responsible for the delivery of data packets from and to mobile stations (e.g., of the UE 120) within its geographical service area. SGSN 115 performs packet routing and transfer, mobility management (attach/detach and location management), logical link management, and authentication and charging functions. The location register of the SGSN stores location information (e.g., current cell, current VLR) and user profiles (e.g., IMSI, address(es) used in the packet data network) of all GPRS users registered with it.

Within GPRS core network 100, a packet data protocol (PDP) context is a data structure present on both SGSN 115 and the GGSN 110 and contains the subscriber GTP session information when the subscriber has an active GTP session. When UE 110 wants to communicate within GPRS core network 100, UE 110 first attaches and then activates a PDP context. In turn, PDP context data structure is allocated in the SGSN (e.g., the SGSN currently serving the subscriber) the corresponding GGSN serving the subscriber's access point. The PDP context data includes, for example: an IP address of UE 110, an International mobile subscriber identity (IMSI), a Tunnel Endpoint ID (TEID) at the GGSN, a Tunnel Endpoint ID (TEID) at the SGSN. The TEID is a number allocated by the GSN which identifies the tunneled data related to a particular PDP context.

Figure 4:
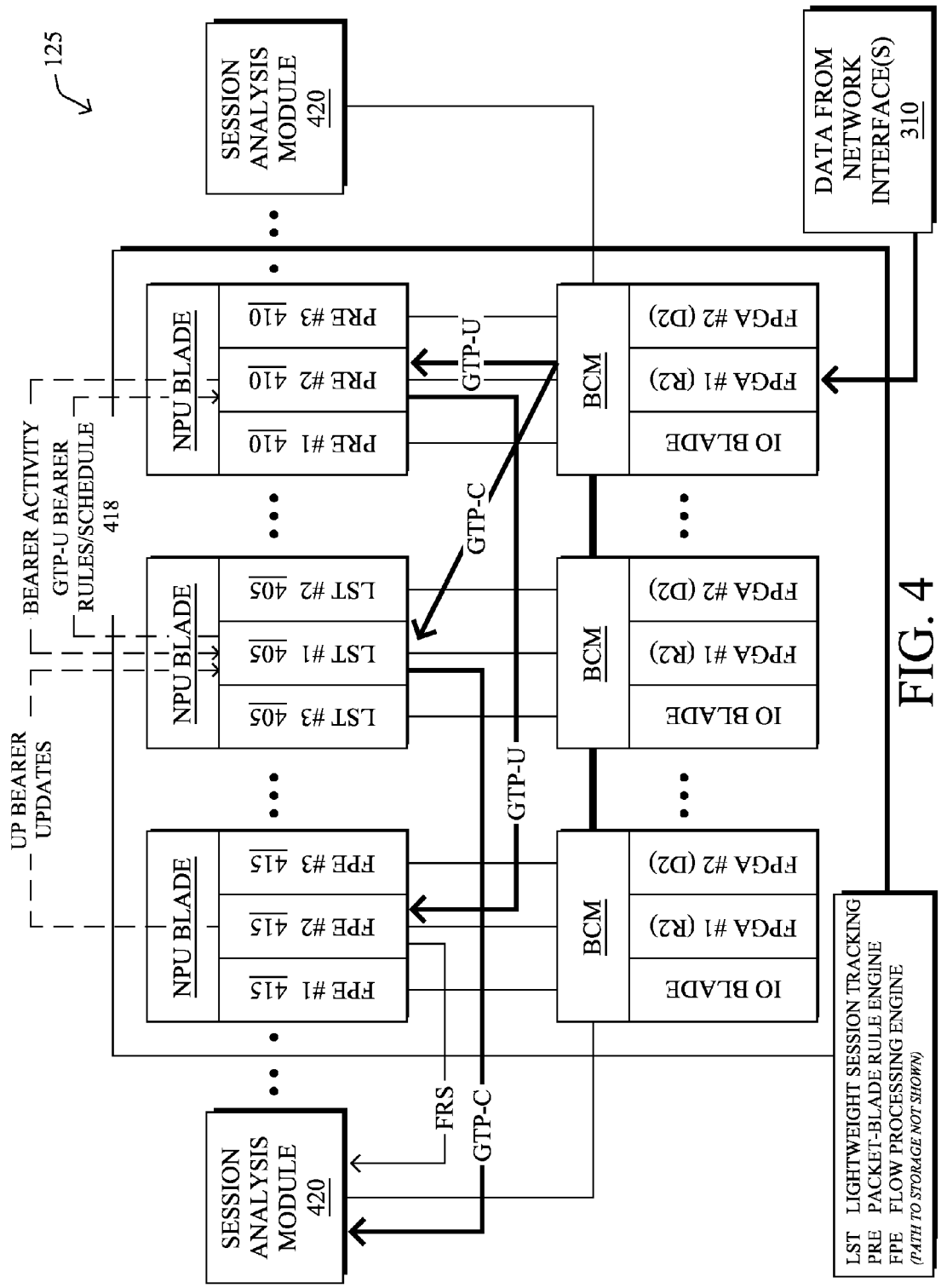
FIG. 4 illustrates an example distributed network monitoring system.

GPRS Core Network 100 as illustrated also includes a network monitoring system 125 that monitors a Gn interface between SGSN 115 and GGSN 110. Network monitoring system 125 will be discussed with greater detail below (ref. FIG. 4).

3GPP Evolved Packet Core (EPC)

As discussed above, the 3rd Generation Partnership Project (3GPP) organization specifies the architecture for various mobile cellular networks. The latest mobile network architecture defined by the 3GPP is called Evolved 3GPP Packet Switched Domain—also known as the Evolved Packet Core (EPC).

Figure 2:
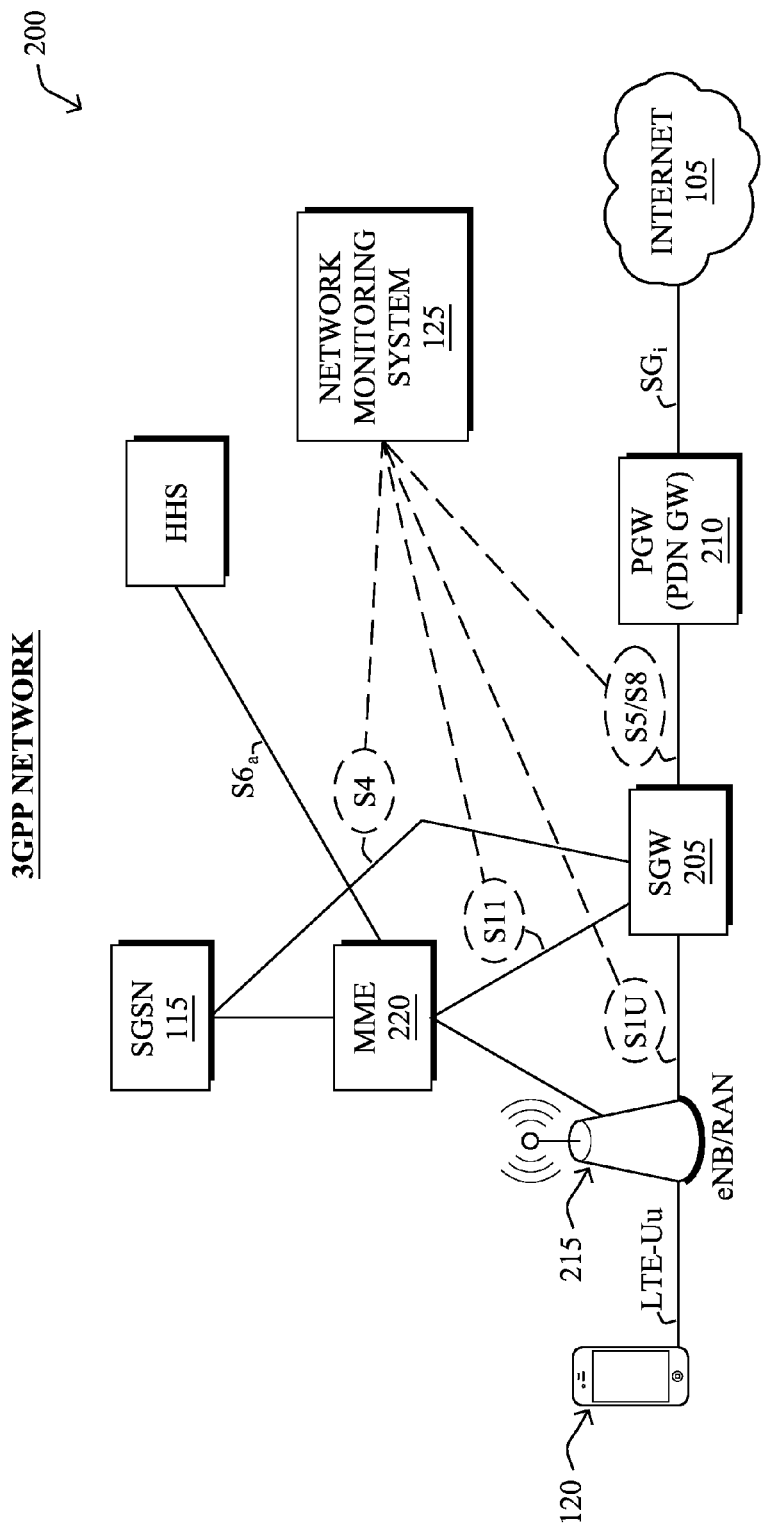
FIG. 2 shows an overview on the architecture of a 3GPP Evolved Packet System (EPS)

Referring to FIG. 2, the EPC architecture 200 includes two data packet gateways located in the EPC supporting the UE's mobility—a Serving Gateway (SGW) 205 and a Packet Data Network Gateway (PGW) 210. SGW 205 terminates the interface towards the radio access networks RAN(s) 215.

PGW 210 performs UE IP address allocation and packet filtering (e.g. deep packet inspection, packet screening) in order to map UE 120 traffic to appropriate Quality of Service (QoS) level. PGW 210 performs the function of a home agent (HA), in case of MIPv6 (Mobile IPv6) based mobility management, or the function of a Local Mobility Anchor (LMA), in case Proxy MIPv6 protocols are used for mobility management.

As illustrated in EPC architecture 200, when UE 120 is attached to the EPC architecture 200, UE 210 is connected to the eNode B (NB) 215, which terminates the air interface. NB 215 is connected to SGW 205 via a S1-U interface (i.e. the user interface for user plane data). The S5 interface between SGW 205 and PGW 210 can, for example, be based on the GPRS Tunneling Protocol (GTP) discussed above.

Further, EPC architecture 200 also illustrates network monitoring system 125 (also shown in FIG. 1), which is discussed in greater detail below (ref. FIG. 4).

Packet Data Network Connection (PDN) for EPC

In the EPC architecture 200, IP connectivity is provided between UE 120 and the Internet 105 (i.e., an external packet data network (PDN)). In the 3GPP terminology, this is referred to as PDN Connectivity Service and the data flow between UE 120 and PGW 210 is usually referred to as a PDN connection. For each PDN connection UE 120 has a different IP configuration, i.e. a different IPv4 address and/or an IPv6 prefix. A PDN connection between UE 120 and PGW 210 is represented by an Access Point Name (APN) (not shown). When UE 120 requests connectivity during an attach procedure to EPC network 200, the UE 120 typically indicates the APN to a Mobility Management Entity (MME) 220.

Evolved Packet System (EPS) Bearers

A PDN connectivity service is provided by an EPS bearer, which conceptually corresponds to the PDP context discussed above with respect to the GPRS core network 100 of FIG. 1. With respect to the EPS bearers, a UE may run multiple applications simultaneously (e.g., a VoIP call, a file download, etc.). For each application a different QoS requirement may exist (e.g., different QoS parameters like packet delay and/or packet delay jitter, packet loss rate, guaranteed bit rate, etc). 3GPP defines that different EPS bearers meet each different QoS requirements of each application. An EPS bearer uniquely identifies traffic flows that receive a common QoS treatment between UE 120 and PGW 210. There could be multiple applications with different QoS requirements to the same PDN, i.e. to the same PDN connection, or just one application per PDN connection. In this fashion, a PDN connection is provided by one or more EPS bearers to the UE.

Typically, when the UE 120 connects to a PDN (e.g., the Internet 105), one EPS bearer is established and remains established throughout the lifetime of the PDN connection to provide the UE 120 with always-on IP connectivity to that PDN. This one bearer is referred to as the "default bearer". A default EPS bearer context is activated, when the UE 120 requests a PDN connection, i.e. a new default EPS bearer is set up for every new PDN connection.

Any additional EPS bearer that is established for the same PDN connection is referred to as a dedicated bearer. A dedicated EPS bearer context is always linked to a default EPS bearer context and represents additional EPS bearer resources between the UE and the PDN. The decision to establish or modify a dedicated bearer can only be taken by the EPC, and the bearer level QoS parameter values are always assigned by the EPC. Therefore, the MME shall not modify the bearer level QoS parameter values received on the S11 reference point during establishment or modification of a dedicated bearer.

In the current 3GPP EPS specification the UE can have a maximum 8 user plane EPS bearers simultaneously, independent of the number of PDN connections. Several applications (or data flows) can be mapped onto one EPS bearer. Each bearer has an associated QoS class of identifier (QCI). Each QCI is characterized by priority, packet delay budget and acceptable packet loss rate. The data traffic mapped to the same EPS bearer receive the same packet forwarding treatment (e.g. scheduling policy, queue management policy, rate shaping policy, RLC configuration, etc.). A limited number of QCIs have been standardized so that vendors can all have the same understanding of the underlying service characteristics and thus provide the corresponding forwarding treatment.

As mentioned above the S5 interlace can be based on GTP. A GTP-based S5 interface, the EPS bearer consists of a concatenation of S5 bearer (PGW-SGW), S1 bearer (SG-WeNode B), a S1-U bearer for the user plane traffic—and a radio bearer (eNode BUE). An S5 bearer transports the packets of an EPS bearer between a PGW and a SGW. The SGW stores a one-to-one mapping between an S1 bearer and an S5 bearer. The bearer is identified in the corresponding gateway by the GTP tunnel endpoint ID (TEM) across both interfaces, i.e. the SGW identifies the S1 bearer by the GTP-TEID (also: S1-TEID) used for the S1 interface and the SGW identifies the S5 bearer by the GTP-TEID (also: S5-TEID) used for the S5 interface. An S1 bearer transports the packets of an EPS bearer between the SGW and an eNode B. A radio bearer transports the packets of an EPS bearer between a UE and an eNodeB.

Figure 3:
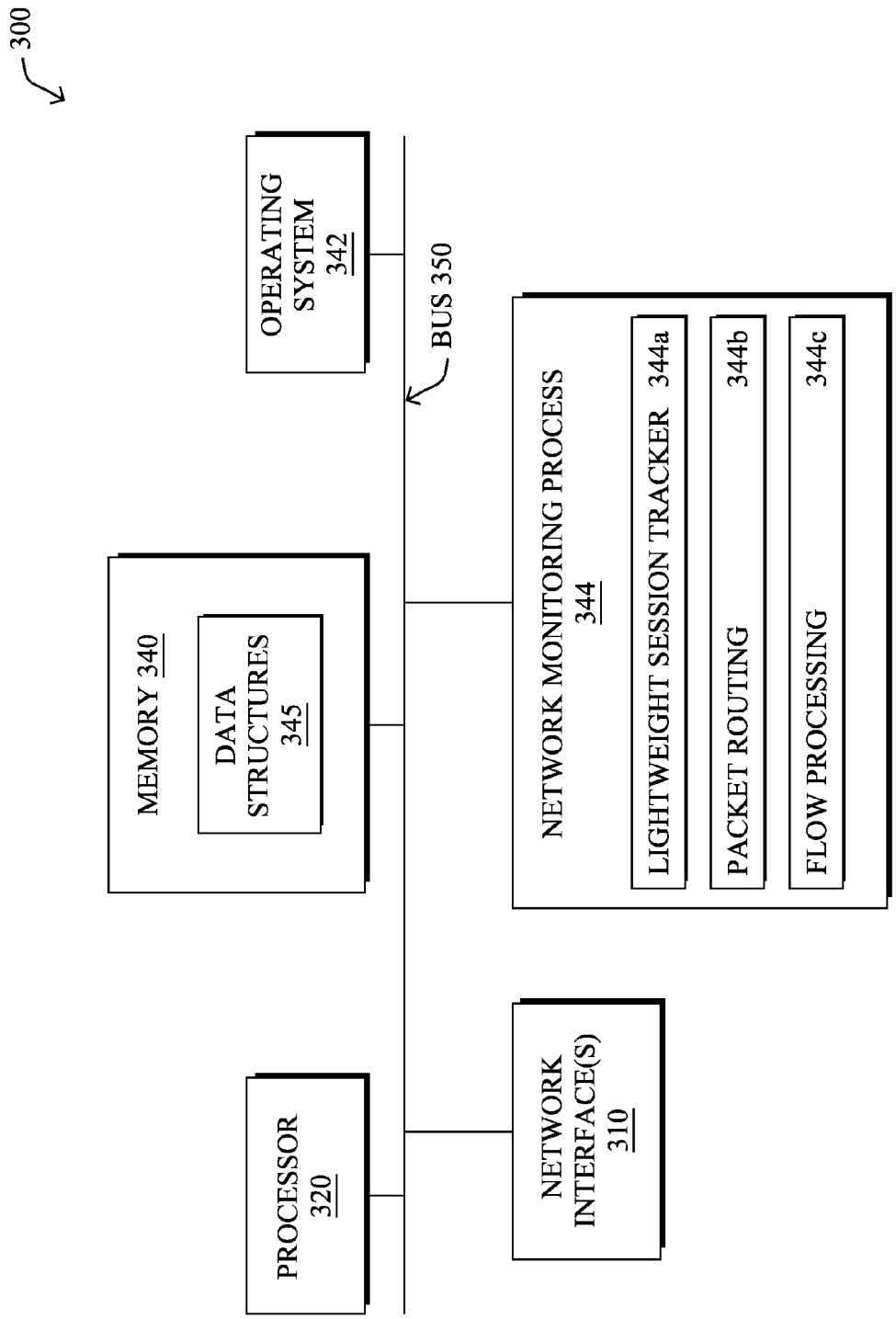
FIG. 3 illustrates an example network device/node.

FIG. 3 is a schematic block diagram of an example node/device 300 that may be used with one or more embodiments described herein, e.g., as part of network monitoring system 125 or as one or more modules of network monitoring system (ref. FIG. 4, below). The device 300 may comprise one or more network interfaces 310, at least one processor 320 (e.g., a microcontroller), and a memory 340 interconnected by a system bus 350.

The network interface(s) 310 contain the mechanical, electrical, and signaling circuitry for communicating data over physical and/or wireless links coupled to networks 100 and 200. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

The memory 340 comprises a plurality of storage locations that are addressable by the processor 320 and the network interfaces 310 for storing software programs and data structures associated with the embodiments described herein. As noted above, certain devices may have limited memory or no memory (e.g., no memory for storage other than for programs/processes operating on the device). The processor 320 may comprise necessary elements or logic adapted to execute the software programs and manipulate data structures 345, such as routes or prefixes (notably on capable devices only). An operating system 342, portions of which are typically resident in memory 340 and executed by the processor, functionally organizes the device by, inter alia, invoking operations in support of software processes and/or services executing on the device. These software processes and/or services may comprise network monitoring process/services 344. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Network monitoring process (services) 344 contains computer executable instructions executed by the processor 320 to perform functions such as a lightweight session tracking process 344a, a packet routing process 344b, and a flow processing process 344c.

Illustratively, the techniques described herein may be performed by hardware, software, and/or firmware, such as in accordance with the network monitoring process 344, which may contain computer executable instructions executed by the processor 320 (or independent processor of interfaces 310) to perform functions relating to the techniques described herein.

As noted above, the increase in mobile devices places additional pressure on various conventional network monitoring techniques within communication networks such as the GPRS network and the 3GPP EPC. In fact, in certain applications, network probes are expected to monitor up to 500 Gbps of GTP traffic with up to 120 Million attached subscribers. Further, the UE for each attached subscriber typically has "always-on" connections, which corresponds to a constantly active GTP session or GTP sessions. While certain conventional techniques merely match the increase in traffic with an increase in network monitoring hardware and software, such approaches are easily not scalable and prove cost prohibitive.

Accordingly, the present invention splits monitoring from a connectivity session (e.g., a GTP session) between control plane (GTP-C) packets and user plane (GTP-U) packets using a distributed network monitoring system 125, illustrated in FIG. 4.

FIG. 4 provides a distributed network monitoring system 125 that includes one or more nodes or devices. As discussed above, example node/device 300 (ref. FIG. 3) can be employed as (or work in conjunction with) any of the below discussed modules. Further, although network monitoring system 125 employs various modules in a distributed system, as discussed herein, it is appreciated that architecture is not limited to the view shown in FIG. 4, but rather certain additional modules can be included and/or certain modules can be excluded while various functionality of such excluded modules can be incorporated in other devices.

Illustratively, network monitoring system 125 monitors session connectivity data (i.e., GTP-C, GTP-U, etc.) via network interfaces 310 (e.g., using network probes, etc.). For example, referring again to FIGS. 1-2, network monitoring system 125 particularly monitors GTP traffic between network interfaces of various nodes, including but not limited to: an Evolved Node B (eNB), a Mobility Management Entity (MME) node, a Serving Gateway (SGW) node, a Packet data Network Gateway (PGW) node, a Serving General Packet Radio Service (GPRS) Support Node (SGSN), and the like.

As shown, network monitoring system 125 includes Lightweight Session Tracking (LST) modules 405 that provide GTP-C processing and one or more Packet Routing Entity (PRE) modules 410 that provide GTP-U processing.

Operatively, network monitoring system 125 receives session connectivity data via network interfaces 310 and separately processes the control plane and user plane data. For example, session connectivity data is received at one or more Field Programmable Gate Arrays within network monitoring device 125 and is split or divided for processing between GTP-C data, by one or more lightweight session tracking modules (LST) 405, and GTP-U data, by one or more packet routing entity (PRE) modules 410

LST modules 405 analyze GTP-C data and determine certain attributes for each bearer (e.g., tunnel ID, IP address, etc.) to generate bearer routing rules 418 (e.g., bearer routing rules) for user plane data Importantly, the LST modules 405 employs selective filtering to identify or filter bearers (e.g., session bearers) according to one or more control plane attributes (e.g., an International Mobile Subscriber Identity (IMSI), International Mobile Station Equipment Identity (IMEI), and a Mobile Station International Subscriber Directory Number (MSISDN), a network node, a network interface, etc.) prior to generating the bearer routing rule 418. In this fashion, the bearer routing rules that the LST modules 405 generate include only a subset of bearer routing rules for corresponding user data. Once generated, LST modules 405 send the routing rule 418 to the PRE modules 410. Typically, LST modules 405 also associate control plane data for a session with a common identifier (e.g., a correlation ID), which is transmitted to one or more session analysis modules 420 (e.g., upper layer monitoring solutions). Further, it should be noted that LST modules 405 operate in real-time and iteratively publish or transmit updated bearer routing rules to the PRE modules. For example, for the LST modules 405 can track changes of Qost for dedicated bearers (e.g., GtpV2) and secondary PDP contexts (for GtpV1) according to the respective control plane attributes.

PRE modules 410 receive user plane data directly from the FPGA(s), as discussed above. Additionally, PRE modules 410 also receive the bearer routing rule(s) 418 from the LST modules 405. PRE modules 410 transmit the user plane data (GTP-U data) according to the bearer routing rule 418 of the LST modules 405 onward to one or more Flow Processing Entity (FPE) modules 415 for subsequent data analysis. Additionally, like the LST modules 405, the PRE modules 410 also associate user plane data for a session with a common identifier (e.g., the correlation ID). When the user plane data is transmitted according to the bearer routing rule 418, the corresponding correlation ID is also transmitted.

Notably, certain GTP-U data, at times, is not included in the bearer routing rule 418 and results in non-routable GTP-U data (i.e., there is no corresponding bearer routing rules in bearer routing rule 418). In certain embodiments, PRE modules 410 merely discard the non-routable GTP-U data and thus, conserve network processing resources (e.g., the non-routable GTP-U data is not forwarded to FPE modules 415). In other embodiments, the PRE modules 410 optionally locally cache the non-routable GTP-U data in case of an updated bearer routing rule 418 being delayed.

With respect to subsequent data analysis, FPE modules 415 correlate uplink and downlink directions of a flow identified by the endpoint IP address and layer 4 protocol. The FPE then outputs a single flow record per flow with various packet level statistics for that flow. Additionally, data analysis is performed by one or more session analysis modules 420 that correlate all control plane PDUs and User Plane Flow Records belonging to a single connectivity session into a session record and then performs state machine analysis of the Control Plane PDU's including but not limited to examining for timeouts, out of sequence and incomplete transactions.

Collectively, network monitoring system 125 uses a combination of initial independent control plane data analysis via the LST modules 405 and selectively filters or selectively identifies bearers of a connectivity session according to control plane attributes to generate bearer routing rules for corresponding user-plane data. In this fashion, valuable network monitoring resources in the network monitoring device 125 are conserved, which resources would otherwise be used to initially analyze a substantial amount of data (e.g., GTP-U and GTP-C data).

Figure 5:
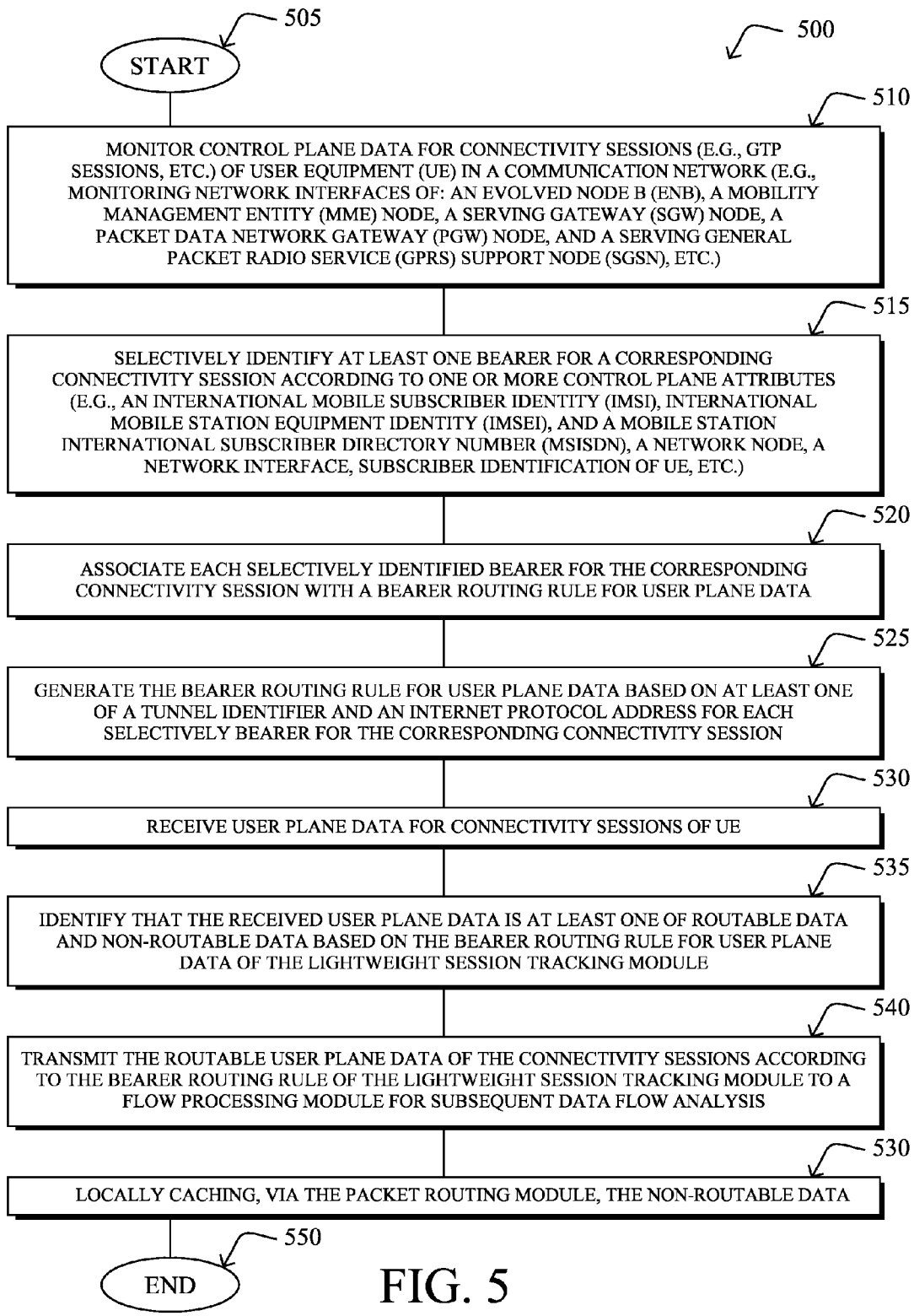
FIG. 5 illustrates an example simplified procedure for selectively, in real-time, tracking connectivity sessions using a distributed network monitoring system.

Referring now to FIG. 5, a simplified procedure 500 for selective real-time GTP session tracking using a distributed network monitoring system is shown. Procedure 500 illustrates selective session tracking using a distributed network monitoring system (e.g., network monitoring system 125 discussed above). Further, procedure 500 is preferably employed by one or more modules that execute, for example, the network monitoring process 344 (e.g., including: a lightweight session tracking process 344a, a packet routing process 344b, a flow process 344c, etc.).

Procedure 500 begins at start 505 and continues to step 510 where, as discussed above, a lightweight session tracking module monitors control plane data for connectivity sessions (e.g., GTP sessions, etc.) of User Equipment (UE) in a communication network (e.g., monitoring network interfaces of: an Evolved Node B (eNB), a Mobility Management Entity (MME) node, a Serving Gateway (SGW) node, a Packet data Network Gateway (PGW) node, and a Serving General Packet Radio Service (GPRS) Support Node (SGSN), etc.).

The lightweight session tracking module, at step 515, selectively identifies at least one bearer for a corresponding connectivity session according to one or more control plane attributes (e.g., an International Mobile Subscriber Identity (IMSI), International Mobile Station Equipment Identity (IMEI), and a Mobile Station International Subscriber Directory Number (MSISDN), a network node, a network interface, subscriber identification of UE, etc.). Once identified, the lightweight session tracking module associates, at step 520, each selectively identified bearer for the corresponding connectivity session with a bearer routing rule for user plane data. For example, as discussed above, the lightweight session tracking module can associate each bearer for the corresponding connectivity session by generating, at step 525, a bearer routing rule for user plane data based on at least one of a tunnel identifier and an Internet Protocol address for each selectively bearer for the corresponding connectivity session.

According to the distributed processing approach discussed above, a packet routing module receives, at step 530, user plane data for connectivity sessions of UE and, at step 535, it identifies that the received user plane data is at least one of routable data and non-routable data based on the bearer routing rule for user plane data of the lightweight session tracking module. Next, at step 540, the packet routing module transmits the routable user plane data of the connectivity sessions according to the bearer routing rule of the lightweight session tracking module to a flow processing module for subsequent data flow analysis. Optionally, in certain embodiments, the packet routing module locally caches the non-routable data.

Subsequently, procedure 500 may end in step 550, or may continue to step 505 where the lightweight session tracking module monitors control plane data for connectivity sessions of UE, discussed above. Although procedure 500 is discussed with respect to various distributed processing modules, it is appreciated by those skilled in the art that such independent modules can very well be incorporated into a single module and/or further distributed amongst various other modules without departing from the spirit scope of the invention.

Further, it should be noted that while certain steps within procedures 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for initial independent control plane data analysis that selectively identifier desired user data for subsequent analysis. Such techniques, as discussed above, are employed in a distributed network monitoring system that independently handles control plane data and user plane data so as to conserve valuable network monitoring resources. Put differently, the techniques described herein initially identify user data for certain connectivity sessions using control plane attributes and selectively analyze the user data corresponding to the control plane attributes. The selective analysis can, for example, identify certain network interfaces, nodes, UE, and the like. Additionally, the substantive analysis for the selected user plane data can be used to measure quality of service (QoS) and other network performance criteria (e.g., to determine key performance indicators (KPIs)).

While there have been shown and described illustrative embodiments that provide for selective session tracking using a distributed processing system with particular respect to GTP connectivity sessions and for particular network interfaces, it is to be understood that various other adaptations and modifications may be made within the spirit and scope of the embodiments herein. For example, the embodiments shown and described herein can readily be adapted for various other network topologies, as is appreciated by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for real-time network monitoring, comprising:

monitoring, via a lightweight session tracking module of a network monitoring device, control plane data for connectivity sessions of User Equipment (UE) in a communication network, each of the connectivity sessions comprises General Packet Radio Service (GPRS) Tunneling Protocol (GTP) session, wherein the monitoring connectivity sessions comprises monitoring GTP protocol control plane message traffic between network interfaces of a plurality of network nodes in the communication network, the plurality of nodes comprises at least one of an Evolved Node B (eNB), a Mobility Management Entity (MME) node, a Serving Gateway (SGW) node, a Packet data Network Gateway (PGW) node, and a Serving General Packet Radio Service (GPRS) Support Node (SGSN);

selectively identifying, via the lightweight session tracking module, at least one bearer for a corresponding connectivity session according to one or more control plane attributes;

associating, via the lightweight session tracking module, each selectively identified bearer for the corresponding connectivity session with a bearer routing rule for user plane data;

receiving, via a packet routing module of the network monitoring device, user plane data for connectivity sessions of UE and associating a correlation identifier with the received user plane data; and transmitting, via the packet routing module, the correlation identifier and the user plane data of the connectivity sessions according to the bearer routing rule of the lightweight session tracking module to a flow processing module for subsequent data flow analysis.

2. The method of claim 1, wherein the one or more control plane attributes include one or more of a network interface, a network node, and subscriber identification of UE.

3. The method of claim 1, wherein the user plane data for connectivity sessions of UE received by the packet routing module that is not included in the bearer routing rule for user plane data of the lightweight session tracking module yields non-routable data, wherein, the method of claim 1 further comprises locally caching, via the packet routing module, the non-routable data.

4. The method of claim 1, wherein the one or more control plane attributes includes at least one of an International Mobile Subscriber Identity (IMSI), International Mobile Station Equipment Identity (IMEI), and a Mobile Station International Subscriber Directory Number (MSISDN).

5. The method of claim 1, wherein associating, via the lightweight session tracking module, each selectively identified bearer for the corresponding connectivity session with a bearer routing rule for user plane data further comprises:

generating the bearer routing rule for user plane data based on at least one of a tunnel identifier and an Internet Protocol address for each selectively bearer for the corresponding connectivity session.

6. A distributed network monitoring system, comprising:
one or more network interfaces adapted to communicate in a communication network;
a processor adapted to execute one or more processes; and
a memory configured to store a process executable by the processor, the process when executed operable to:
monitor control plane data for connectivity sessions of User Equipment (UE) in a communication network, each of the connectivity sessions comprises General Packet Radio Service (GPRS) Tunneling Protocol (GTP) session, wherein process to monitor connectivity sessions, when executed, is further operable to monitor GTP protocol control plane message traffic between the one or more network interfaces of a plurality of network nodes in the communication network, the plurality of nodes comprises at least one of an Evolved Node B (eNB), a Mobility Management Entity (MME) node, a Serving Gateway (SGW) node, a Packet data Network Gateway (PGW) node, and a Serving General Packet Radio Service (GPRS) Support Node (SGSN);
selectively identify at least one bearer for a corresponding connectivity session according to one or more control plane attributes;
associate each selectively identified bearer for the corresponding connectivity session with a bearer routing rule for user plane data;
receive user plane data for connectivity sessions of UE and associate a correlation identifier with the received user plane data; and
transmit the correlation identifier and the user plane data of the connectivity sessions according to the bearer routing rule of the lightweight session tracking module to a flow processing module for subsequent data flow analysis.

7. The system of claim 6, wherein the one or more control plane attributes include one or more of a network interface, a network node, and subscriber identification of UE.

8. The system of claim 6, wherein the received user plane data for connectivity sessions of UE that is not included in the bearer routing rule for user plane data yields non-routable data, wherein, the process when executed is further operable to locally cache the non-routable data.

9. The method of claim 6, wherein the one or more control plane attributes includes at least one of an International Mobile Subscriber Identity (IMSI), International Mobile Station Equipment Identity (IMEI), and a Mobile Station International Subscriber Directory Number (MSISDN).

10. The method of claim 6, wherein process to associate each selectively identified bearer for the corresponding connectivity session with a bearer routing rule for user plane data, when executed, is further operable to:

generate the bearer routing rule for user plane data based on at least one of a tunnel identifier and an Internet Protocol address for each selectively bearer for the corresponding connectivity session.

11. A tangible, non-transitory, computer-readable media having software encoded thereon, the software, when executed by a processor, operable to:

monitor control plane data for connectivity sessions of User Equipment (UE) in a communication network, each of the connectivity sessions comprises General Packet Radio Service (GPRS) Tunneling Protocol (GTP) session, wherein the software to monitor connectivity sessions, when executed, is further operable to monitor GTP protocol control plane message traffic between the one or more network interfaces of a plurality of network nodes in the communication network, the plurality of nodes comprises at least one of an Evolved Node B (eNB), a Mobility Management Entity (MME) node, a Serving Gateway (SGW) node, a Packet data Network Gateway (PGW) node, and a Serving General Packet Radio Service (GPRS) Support Node (SGSN);
selectively identify at least one bearer for a corresponding connectivity session according to one or more control plane attributes;
associate each selectively identified bearer for the corresponding connectivity session with a bearer routing rule for user plane data;
receive user plane data for connectivity sessions of UE and associate a correlation identifier with the received user plane data; and
transmit the correlation identifier and the user plane data of the connectivity sessions according to the bearer routing rule of the lightweight session tracking module to a flow processing module for subsequent data flow analysis.

12. The non-transitory, computer-readable media of claim 11, wherein the one or more control plane attributes include one or more of a network interface, a network node, and subscriber identification of UE.

13. The non-transitory, computer-readable media of claim 11, wherein the received user plane data for connectivity sessions of UE that is not included in the bearer routing rule for user plane data yields non-routable data, wherein, the software when executed is further operable to locally cache the non-routable data.

14. The non-transitory, computer-readable media of claim 11, wherein the one or more control plane attributes includes at least one of an International Mobile Subscriber Identity (IMSI), International Mobile Station Equipment Identity (IMEI), and a Mobile Station International Subscriber Directory Number (MSISDN).

15. The non-transitory, computer-readable media of claim 11, wherein the software, when executed by the processor to associate each selectively identified bearer for the corresponding connectivity session with a bearer routing rule for user plane data, when executed, is further operable to:
   generate the bearer routing rule for user plane data based on at least one of a tunnel identifier and an Internet Protocol address for each selectively bearer for the corresponding connectivity session.

* * * * *